US008941852B2

(12) United States Patent
Misawa (10) Patent No.: US 8,941,852 B2
(45) Date of Patent: Jan. 27, 2015

(54) PRINT DATA PROCESSING SYSTEM, PRINT DATA PROCESSING METHOD, AND NON-TRANSITORY COMPUTER READABLE MEDIUM

(71) Applicant: Fuji Xerox Co., Ltd., Minato-ku, Tokyo (JP)

(72) Inventor: Satoshi Misawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/945,101

(22) Filed: Jul. 18, 2013

(65) Prior Publication Data

US 2014/0192378 A1 Jul. 10, 2014

(30) Foreign Application Priority Data

Jan. 10, 2013 (JP) ................................. 2013-002582

(51) Int. Cl.
*G06K 15/00* (2006.01)
*G06F 3/12* (2006.01)
(52) U.S. Cl.
CPC .............. *G06F 3/1211* (2013.01); *G06F 3/124* (2013.01); *G06F 3/1245* (2013.01); *G06F 3/1285* (2013.01)
USPC .......... 358/1.13; 358/1.15; 358/1.9; 358/1.16; 358/404; 382/302
(58) Field of Classification Search
CPC ... G06F 3/1284; G06F 3/1211; G06F 3/1245; G06F 3/122; G06F 3/1296; G06F 3/1215; G06K 15/02; G06K 15/1823; G06K 15/00; G06K 2215/0077; G06K 2215/0028; G06K 2215/0054
USPC ........ 358/1.2, 2.1, 1.9, 1.11–1.18, 3.01, 3.26, 358/521; 345/505, 506, 441; 382/302–304
See application file for complete search history.

(56) References Cited

U.S. PATENT DOCUMENTS

| 5,157,765 | A | * | 10/1992 | Birk et al. ..................... 345/506 |
| 6,040,917 | A | * | 3/2000 | Campbell et al. ............. 358/1.17 |
| 6,369,910 | B1 | * | 4/2002 | Mitani ........................ 358/1.17 |
| 6,456,390 | B1 | * | 9/2002 | Okubo et al. ................ 358/1.17 |
| 2005/0057774 | A1 | * | 3/2005 | Maruyama ................... 358/1.15 |
| 2011/0075165 | A1 | * | 3/2011 | Hayakawa ..................... 358/1.9 |
| 2012/0243047 | A1 | * | 9/2012 | Hayakawa ................... 358/1.16 |

FOREIGN PATENT DOCUMENTS

| JP | 2011-70337 A | 4/2011 |
| JP | 2011-201146 A | 10/2011 |

* cited by examiner

*Primary Examiner* — Chad Dickerson
(74) *Attorney, Agent, or Firm* — Sughrue Mion, PLLC (57) ABSTRACT

A print data processing system includes plural intermediate data generation units, an allocation unit, one or more memories, a print image conversion unit, and a reprint controller. Each intermediate data generation unit interprets PDL data and generates intermediate data in units of pages. The allocation unit allocates processes of interpreting the PDL data to the intermediate data generation units in units of pages and causes the intermediate data generation units to execute processes of interpreting pages in parallel. The one or more memories store pieces of intermediate data of the individual pages. The print image conversion unit acquires the pieces of intermediate data, converts the acquired data to print image data, and supplies the print image data to a printer. The reprint controller performs control to cause the print image conversion unit to reacquire the pieces of intermediate data and to reconvert the reacquired data to the print image data.

7 Claims, 4 Drawing Sheets

PRINT DATA PROCESSING SYSTEM, PRINT DATA PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-002582 filed Jan. 10, 2013.

BACKGROUND (i) Technical Field

The present invention relates to a print data processing system, a print data processing method, and a non-transitory computer readable medium.

(ii) Related Art

Technologies of processing print data in parallel using plural raster image processors (RIPs) to increase print output speed are available. Here, a RIP is hardware or software for converting print data described in a page description language (PDL), such as PostScript (registered trademark) or a portable document format (PDF), into data of a raster format or the like that may be printed or displayed.

SUMMARY

According to an aspect of the invention, there is provided a print data processing system including plural intermediate data generation units, an allocation unit, one or more memories, a print image conversion unit, and a reprint controller. Each of the plural intermediate data generation units interprets page-description-language data representing a target document to be printed and generates intermediate data in units of pages. The allocation unit allocates processes of interpreting the page-description-language data to the plural intermediate data generation units in units of pages and causes the plural intermediate data generation units to execute processes of interpreting pages in parallel. The one or more memories store pieces of intermediate data of the individual pages generated by the plural intermediate data generation units. The print image conversion unit acquires the pieces of intermediate data of the individual pages from the one or more memories via a communication path between the print image conversion unit and the one or more memories, converts the acquired pieces of intermediate data of the individual pages to print image data that is capable of being handled by a printer, and supplies the print image data to the printer. In a case where an instruction to reprint the target document is provided, the reprint controller performs control to cause the print image conversion unit to reacquire the pieces of intermediate data that correspond to the target document and that are stored in the one or more memories, and to reconvert the reacquired pieces of intermediate data to the print image data.

BRIEF DESCRIPTION OF THE DRAWINGS

An exemplary embodiment of the present invention will be described in detail based on the following figures, wherein.

DETAILED DESCRIPTION

Hereinafter, a print data processing system according to an exemplary embodiment will be described with reference to the drawings.

Figure 1:
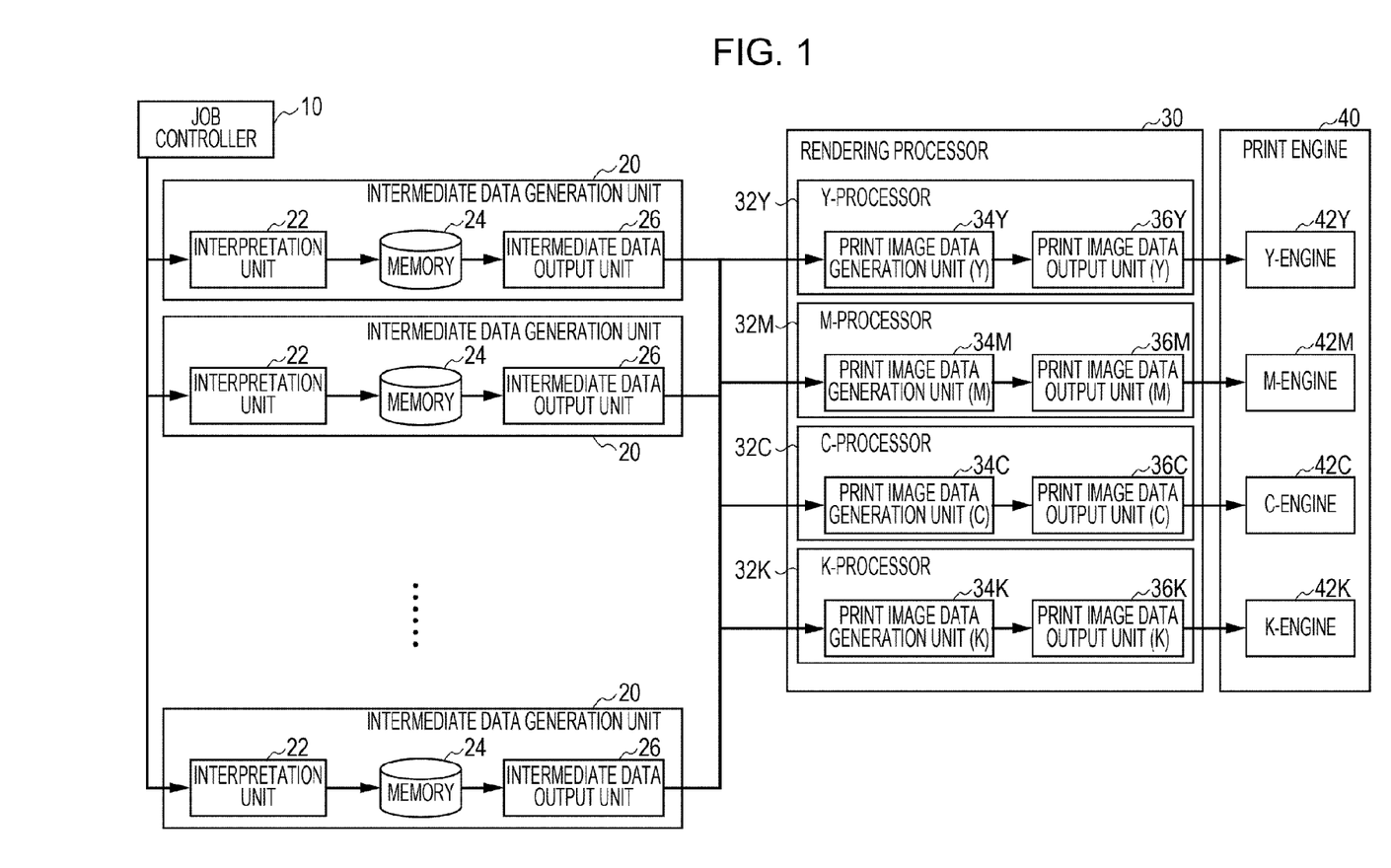
FIG. 1 is a functional block diagram illustrating an example of a print data processing system according to an exemplary embodiment.

FIG. 1 illustrates an example of the print data processing system according to the exemplary embodiment. The system includes a job controller 10, plural intermediate data generation units 20, a rendering processor 30, and a print engine 40.

The job controller 10 manages a print instruction input thereto as a job, and executes the job by controlling other elements of the system. An input print instruction includes print data, which is a document image that is to be printed and that is described in a page description language (PDL). The "job" is a print instruction provided from a user, and is defined as a "job" on the system side. The job controller 10 analyzes print data and instruction parameters (for example, the number of copies and the setting of imposition) included in the print instruction, generates management information for the job in accordance with the analysis result, and manages execution of the job (print processing) in accordance with the management information. A typical job control function of the job controller 10 is common knowledge, and thus the description thereof is omitted.

The job controller 10 according to the exemplary embodiment has, in addition to the typical job control function, a function of allocating processing operations for different pages of print data to the plural intermediate data generation units 20 so that the processing operations are performed in parallel. The manner of allocating pages to the intermediate data generation units 20 is not particularly limited. For example, each intermediate data generation unit 20 may accept allocation of a new page from the job controller 10 every time the intermediate data generation unit 20 becomes capable of accepting a new page after finishing processing of a page.

Each intermediate data generation unit 20 interprets print data (PDL data) of a page allocated from the job controller 10, and generates intermediate data representing an image of the page. Intermediate data is data of an image to be printed, and is described in an intermediate language. An intermediate language is a language at a level between a data format closely related to hardware, such as a raster format accepted by the print engine 40, and a PDL, which is a high-level language.

Specific examples of intermediate data include a display list and a format described in FIGS. 3 and 4 of Japanese Unexamined Patent Application Publication No. 2011-070337 (a PDL object is expressed by being divided into small rectangular objects having a one-pixel width). Of course, intermediate data is not limited thereto.

The size of data representing the same image is the smallest in the form of PDL data, and is the second smallest in the form of intermediate data. The size of image data for hardware, such as a raster format, is much larger than these two types of data. The time required to convert intermediate data to print image data of a raster format or the like (or a processing load that may be expressed by the product of computer performance and a processing time) is shorter than the time required to convert PDL data into similar print image data (or a processing load). Many of intermediate languages may be converted to a raster format simply by processing in a hardware circuit. Using such an intermediate language enables high-speed conversion through hardware processing.

Each intermediate data generation unit 20 includes an interpretation unit 22, a memory 24, and an intermediate data output unit 26. The interpretation unit 22 interprets PDL data, and thereby generates intermediate data, which is an image of a page allocated from the job controller 10 and expressed in an intermediate language. In the example illustrated in FIG. 1, pieces of intermediate data corresponding to four basic colors for printing used by the print engine 40, that is, yellow (Y), magenta (M), cyan (C), and black (K), are generated. In this example, the print engine 40 uses four color materials (ink or toner) of Y, M, C, K, and thus pieces of intermediate data corresponding to the four colors are generated, but this is merely an example. Intermediate data may include pieces of data corresponding to color materials used by the print engine 40. Also, generating such pieces of intermediate data corresponding to individual colors is merely an example. Alternatively, composite intermediate data including pieces of data of basic color components used by the print engine 40 may be generated.

The intermediate data generated by the interpretation unit 22 in units of pages is stored in the memory 24.

The memory 24 is a data storage device including a storage medium, such as a random access memory, a flash memory, or a hard disk. The memory 24 has capacity capable of storing intermediate data of each page for a certain period in preparation for reprinting. That is, the capacity of the memory 24 is larger than capacity that is necessary for implementing a buffer function between the upstream side (the interpretation unit 22) and the downstream side (the rendering processor 30). However, the amount of intermediate data is much smaller than the amount of print image data of a raster format or the like, and thus the capacity necessary for the memory 24 may be much smaller than capacity that is necessary for storing print image data of the same pages.

In the exemplary embodiment, the memories 24 of the plural intermediate data generation units 22, which share a single job to perform parallel processing, store intermediate data of individual pages of the job in a sharing manner. In a typical example, the memory 24 of each intermediate data generation unit 20 stores intermediate data of a page that has been processed by the interpretation unit 22 of the intermediate data generation unit 20. Alternatively, the memory 24 of a certain intermediate data generation unit 20 may store intermediate data of pages that have been processed by some other intermediate data generation units 20, as well as intermediate data of a page that has been processed by the certain intermediate data generation unit 20.

The memory 24 is used as, for example, a buffer for transferring intermediate data generated by the interpretation unit 22 to the rendering processor 30 in the subsequent stage. Also, the memory 24 stores intermediate data of individual pages of a stored job in accordance with an explicit storage instruction of the job from a user, or a system setting for storing the job. The intermediate data of the job that has been stored is deleted from the memory 24 in accordance with an explicit deletion instruction from a user or satisfaction of a deletion condition that is set in the system (for example, elapse of a storage period that is set). The intermediate data of the job that is stored in the memory 24 is read out in accordance with a reprint instruction and is supplied to the rendering processor 30.

The intermediate data output unit 26 outputs intermediate data of individual pages generated by the interpretation unit 22 to the rendering processor 30. In the example illustrated in FIG. 1, pieces of intermediate data of individual color components of individual pages are transferred to a Y-processor 32Y, an M-processor 32M, a C-processor 32C, and a K-processor 32K of the rendering processor 30, respectively.

Each of the intermediate data generation units 20 illustrated in FIG. 1 has a configuration in which intermediate data generated by the interpretation unit 22 is stored in the memory 24, and the intermediate data output unit 26 reads out the intermediated data stored in the memory 24 and transfers it to the rendering processor 30. This is merely an example. In the exemplary embodiment, it is only necessary that intermediate data of individual pages of a job generated by the interpretation unit 22 be stored in the memory 24 and that the stored intermediate data be output in accordance with a reprint instruction. As long as intermediate data may be stored in such a manner, the memory 24 may be in any connection relationship with the interpretation unit 22 and the intermediate data output unit 26.

The system according to the exemplary embodiment includes the above-described plural intermediate data generation units 20. Each of the intermediate data generation units 20 is implemented by, for example, causing a computer to execute a program describing the functions of the above-described interpretation unit 22 and the intermediate data output unit 26. The hardware configuration of the computer in which the individual intermediate data generation units 20 are loaded is not particularly limited. For example, the computer may be a single personal computer (PC), or may be individual server units or blades constituting a rack-mount server or a blade server. It is not necessary to load the entire intermediate data generation unit 20 as a software system, and part of the functions may be implemented by a hardware circuit loaded in the computer.

Each of the intermediate data generation units 20 is connected to at least the job controller 10 via a communication path, such as a local area network (LAN) or a data communication cable. Also, each of the intermediate data generation units 20 is connected to the rendering processor 30 via a communication path, such as a LAN. The communication path between the job controller 10 and each of the intermediate data generation units 20 and the communication path between each of the intermediate data generation units 20 and the rendering processor 30 may be the same (for example, the same network), or may be different from each other.

The job controller 10 may be loaded as a software system, like the intermediate data generation units 20. For example, the job controller 10 is loaded in a computer in which any of the intermediate data generation units 20 in the system is loaded. Alternatively, the job controller 10 may be loaded in an independent computer that is different from the computer in which the individual intermediate data generation units 20 are loaded.

The rendering processor 30 executes rendering processing, that is, processing of converting intermediate data into print image data of a raster format or the like that is capable of being processed by the print engine 40. In the example illustrated in FIG. 1, the rendering processor 30 includes four processors corresponding to color materials used by the print engine 40, that is, the Y-processor 32Y, the M-processor 32M, the C-processor 32C, and the K-processor 32K. Hereinafter, each of these processors will be referred to as a "processor 32" when it is not necessary to distinguish them from one another. Likewise, each of print image data generation units 34Y, 34M, 34C, and 34K included in the processors 32 for individual colors will be referred to as a "print image data generation unit 34", and each of print image data output units 36Y, 36M, 36C, and 36K will be referred to as a "print image data output unit 36".

Each of the print image data generation units 34 processes data (in the format of an intermediate language) of the corresponding color supplied from the intermediate data generation unit 20, and converts the data into print image data of a raster format or the like that is capable of being handled by the print engine 40. In the example illustrated in FIG. 1, the print image data generation units 34Y, 34M, 34C, and 34K generate pieces print image data of colors Y, M, C, and K of the same page in parallel. The generated pieces of print image data of the individual colors are supplied to a Y-engine 42Y, an M-engine 42M, a C-engine 42C, and a K-engine 42K in the print engine 40 by the print image data output units 36Y, 36M, 36C, and 36K, respectively.

The print engine 40 prints images represented by the pieces print image data onto a medium, such as a sheet. The print engine 40 includes the Y-engine 42Y, the M-engine 42M, the C-engine 42C, and the K-engine 42K that form images of the individual color materials on a medium.

The print image data generation units 34 and the print image data output units 36 for the individual colors are typically loaded as a hardware circuit including circuit elements, such as a large scale integration (LSI), an application specific integrated circuit (ASIC), or a dynamic reconfigurable processor (DRP). However, this is not necessary, and part or all of the functions of the print image data generation units 34 and the print image data output units 36 may be implemented as software.

For example, the rendering processor 30 is disposed in a housing of a printer including the print engine 40. Alternatively, the rendering processor 30 may be provided as an apparatus separated from the printer including the print engine 40.

Next, a flow of print processing and reprint processing performed in the system illustrated in FIG. 1 will be described.

If a user wants to print document data stored in his/her PC, the user specifies the system illustrated in FIG. 1 as an output destination and issues an instruction to print the document data. In response to the instruction, a printing device driver in the PC converts the document data into print data described in a PDL, and transmits a print instruction including the print data and print parameters such as the number of copies to the job controller 10. Upon receiving the print instruction, the job controller 10 assigns a unique job ID (identification information) to the received print instruction, and manages execution of a job corresponding to the print instruction. When it becomes possible to execute the print instruction (job), for example, when the processing of the preceding job ends, the job controller 10 sequentially allocates processing operations of different pages of the print data to the individual intermediate data generation units 20 that are under control. The job controller 10 records information indicating which page has been allocated to which intermediate data generation unit 20, in association with the job ID of the job.

The interpretation unit 22 of each intermediate data generation unit 20 interprets the print data, generates intermediate data of a page allocated thereto, stores the intermediate data in the memory 24, and accepts allocation of the next page. Here, intermediate data of each page is stored in the memory 24 in association with the job ID and a page number.

For example, in accordance with the progress of rendering and print output in the rendering processor 30 and the print engine 40, the job controller 10 instructs the intermediate data generation unit 20 that stores intermediate data of the page that is to be printed next to transfer the intermediate data of the page to the rendering processor 30, in the order of pages to be printed. In response to the instruction, the intermediate data output unit 26 transfers the intermediate data of individual colors of the specified page to the processors 32 for the corresponding colors in the rendering processor 30 via a communication path, such as a network. The processors 32 for the individual colors in the rendering processor 30 respectively process the transferred pieces of intermediate data, thereby generating pieces of print image data, and supply the generated pieces of print image data to the engines 42 of the corresponding colors in the print engine 40. Accordingly, the pieces of print image data of the individual colors are sequentially formed into an image on a medium, and a color print result of the page is generated.

The flow of printing a document for the first time has been described above. Next, an example of a flow of reprinting will be described.

In the case of reprinting a document that has been printed before, a user accesses the job controller 10, and selects a job to be reprinted from a list of jobs that the job controller 10 has printed before (for example, jobs for which the user has provided a print instruction before). Here, the job controller 10 stores a record indicating the intermediate data generation units 20 that store pieces of intermediate data of individual pages of the selected job (that is, the intermediate data generation units 20 to which individual pages were allocated at the first printing). In accordance with the record, the job controller 10 instructs the intermediate data generation unit 20 that stores the intermediate data of the page to be printed next to transfer the intermediate data of the page to the rendering processor 30, in the order of the pages to be printed, in accordance with the progress of rendering and print output in the rendering processor 30 and the print engine 40. The instruction may include information about a job ID and a page number. With this instruction, as in the case of the first printing, pieces of intermediate data of individual pages of the job stored in the memories 24 of the individual intermediate data generation units 20 are sequentially transferred to the rendering processor 30, and are printed through the processing performed by the rendering processor 30 and the print engine 40.

Here, the job controller 10 stores information indicating the intermediate data generation units 20 that store pieces of intermediate data of individual pages of a job, but this is not necessary. In a case where the job controller 10 does not store such information, for example, the job controller 10 may transmit an output instruction including a job ID and a page number to all the intermediate data generation units 20, and the intermediated data generation unit 20 that has the intermediate data corresponding to the pair of the job ID and the page number among the intermediate data generation units 20 may transmit the intermediate data to the subsequent stage.

In the above-described example, the job controller 10 instructs the individual intermediate data generation units 20 to output intermediate data, but this is not necessary. Alternatively, the rendering processor 30 may request the intermediate data generation units 20 to transmit intermediate data of the next page every time the rendering processor 30 becomes capable of accepting the intermediate data of the next page. In this case, for example, the job controller 10 notifies the rendering processor 30 of the job ID of the job to be output. Accordingly, the rendering processor 30 acquires pieces of intermediate data of individual pages corresponding to the job ID from the intermediate data generation units 20 in the order of the pages to be printed. For the acquisition, the rendering processor 30 may transmit an acquisition request including the job ID and a page number to all the intermediate data generation units 20. Alternatively, the rendering processor 30 may receive record information, which indicates the intermediate data generation units 20 to which individual pages of the job of the job ID are allocated, from the job controller 10 in advance (for example, together with an output instruction), and may acquire pieces of intermediate data of the individual pages from the intermediate data generation units 20 with reference to the record information.

As described above, in the system illustrated in FIG. 1, the data used for reprinting a job is stored in the form of intermediate data in the memory 24. Accordingly, the time required for reprinting is shorter than in a case where interpretation (RIP) processing is performed again on PDL data at the time of reprinting, and the storage capacity necessary for storage is much smaller than in a case where data of a job is stored as print image data of a raster format or the like.

The plural intermediate data generation units 20 included in the system illustrated in FIG. 1 may be located at different positions of a communication path, such as a network, or may be connected to the rendering processor 30 via different communication paths. In such a case, the speeds of data transfer between the individual intermediate data generation units 20 and the rendering processor 30 are generally different. For example, in a case where one of the intermediate data generation units 20 is directly connected to a high-speed network to which the rendering processor 30 is connected, and another one of the intermediate data generation units 20 is connected to the high-speed network via a low-speed network, the data transfer speed with respect to the rendering processor 30 of the latter is lower than the former.

To efficiently operate the print engine 40 without causing suspension, it is necessary that the speed of transferring intermediate data from each intermediate data generation unit 20 to the rendering processor 30 (in other words, the time required to transfer intermediate data of one page) be higher than or equal to the print speed of the print engine 40 (in other words, the print time per page). Otherwise, supply of intermediate data becomes incapable of keeping pace during a job. In that case, it is necessary to suspend the print engine 40 until a necessary amount of data is supplied. From the viewpoint of a processing speed, suspension is not favorable because a certain period of time is required for suspension and restart of printing. Depending on the printing method or the type of the print engine 40, operation does not immediately stop after a suspension instruction is provided, a medium is transported by a certain distance until the operation stops, and data may be partially printed. In such a case, a normal print result is not obtained on the medium, which results in a "waste sheet".

To suppress such suspension, the system according to the exemplary embodiment may have a mode in which distribution destinations of pages of a job are limited to intermediate data generation units 20 having a sufficiently high data transfer speed of transferring data to the rendering processor 30. That is, in accordance with whether or not the data transfer speed of each intermediate data generation unit 20 with respect to the rendering processor 30 (for example, a value representing how many pages of intermediate data may be transferred to the rendering processor 30 per unit time) is higher than or equal to a speed corresponding to the print speed of the print engine 40 (for example, a value representing how many pages of print image data may be printed per unit time), it is determined whether or not the intermediate data generation unit 20 is to participate in distribution processing for generating intermediate data. The "speed corresponding to the print speed" may be the print speed of the print engine 40, or may be a speed that is set on the basis of the print speed in view of delay caused by overhead or the like for data transfer processing. Hereinafter, to avoid complexity of description, the "speed corresponding to the print speed" will be simply referred to as "print speed". That is, if there is a description such as "whether or not the data transfer speed is higher than or equal to the print speed" below, that means "whether or not the data transfer speed is higher than or equal to the speed corresponding to the print speed".

The foregoing mode will be described below with reference to FIGS. 2 and 3.

Figure 2:
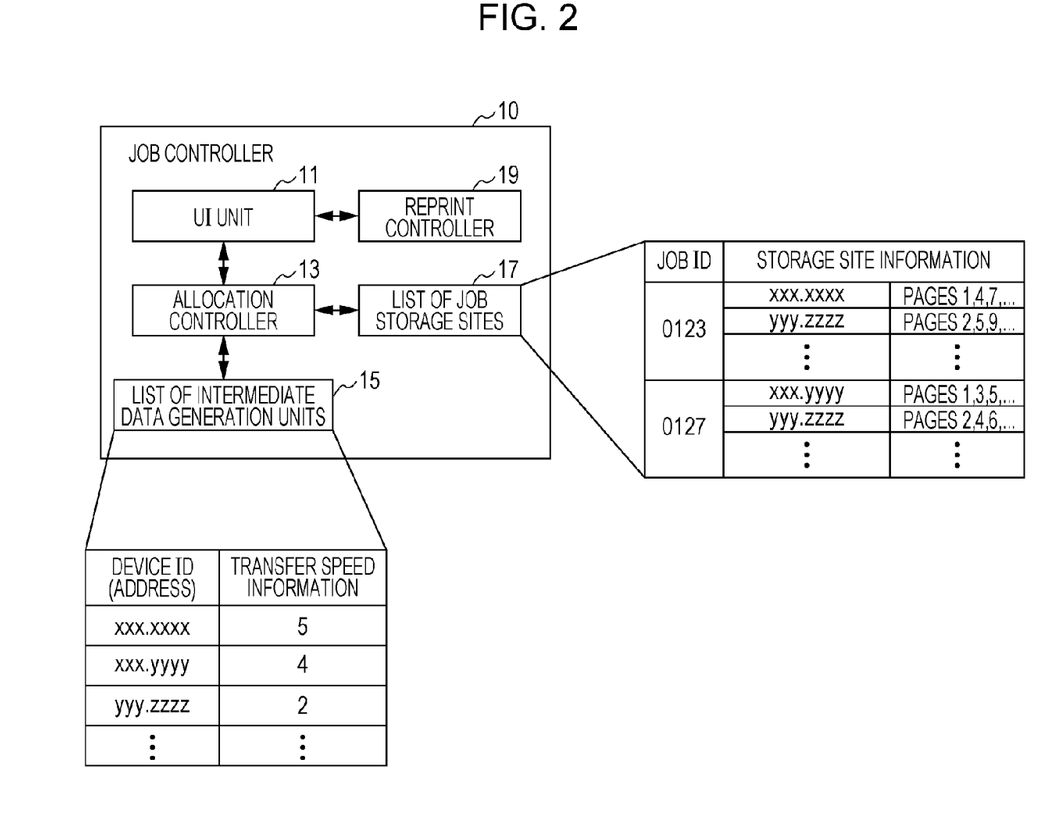
FIG. 2 is a diagram illustrating an example of a functional configuration of a job controller.

FIG. 2 illustrates an example of the functional configuration of the job controller 10. The job controller 10 includes a user interface (UI) unit 11, an allocation controller 13, a list of intermediate data generation units 15, a list of job storage sites 17, and a reprint controller 19.

The UI unit 11 is a user interface mechanism for the system according to the exemplary embodiment, and accepts a print instruction about a new document and a reprint instruction about a document that has already been printed in the system. For example, upon accepting a reprint instruction from a user, the UI unit 11 provides a screen showing a list of jobs whose intermediate data is stored in the memories 24 (the list may be a list of jobs specified by the user or a list of jobs to which the user is accessible), and accepts selection of a target to be reprinted.

In response to a print instruction about a new document, the allocation controller 13 allocates processing operations of individual pages of the print data related to the print instruction to the individual intermediate data generation units 20.

The list of intermediate data generation units 15 is a list of the intermediate data generation units 20 that belong to this system. The list 15 may be created by, for example, a system manager. In the list 15, device IDs (for example, addresses on a network) and transfer speed information of the individual intermediate data generation units 20 are registered. The transfer speed information is information indicating the speeds of data transfer from the intermediate data generation units 20 to the rendering processor 30. In the example illustrated in FIG. 2, values representing relative levels of transfer speed are registered as transfer speed information. As the value of the level increases, the transfer speed increases. The transfer speed information may be obtained using information about a network path that connects the intermediate data generation units 20 and the rendering processor 30 (for example, information about transmission speeds of individual networks on paths connecting the intermediate data generation units 20 and the rendering processor 30), or may be obtained by actually measuring the data transfer speeds therebetween. In the latter case, a transfer speed that is measured in advance may be used in a fixed manner, or a transfer speed may be periodically measured to update transfer speed information. In the list 15, information other than the information illustrated in FIG. 2, for example, information that helps a user to identify the individual intermediate data generation units 20, such as the names and installation places of the individual intermediate data generation units 20, may be registered.

When a print instruction about a new document is to be accepted from a user, information about the list of intermediate data generation units 15 may be presented to the user so that the user is allowed to select one or more intermediate data generation units 20 to be used for processing the print instruction.

Alternatively, on the basis of the transfer speed information registered in the list of intermediated data generation units 15, only the intermediate data generation units 20 whose data transfer speed with respect to the rendering processor 30 is higher than or equal to the print speed of the print engine 40 may be selected as targets to which processing operations of pages are allocated.

The allocation controller 13 allocates processing operations of individual pages of a job to the intermediate data generation units 20 that have been selected in accordance with an instruction provided from the user, or a condition that the data transfer speed is higher than or equal to the print speed, or both of the instruction and the condition. In this example, the user is allowed to specify whether or not the intermediate data of a job is to be stored for reprinting. If it is specified to store the intermediate data, each of the intermediate data generation units 20 stores the intermediate data of the page allocated thereto in the memory 24 in response to the specification. In such a case where specification to store intermediate data of a job is accepted, the allocation controller 13 records, in the list of job storage sites 17, the intermediate data generation units 20 to which the individual pages of the job have been allocated (stored). That is, in the list of job storage sites 17, information indicating pages of each job allocated to the intermediate data generation units 20 is recorded in association with the job ID of the job, as illustrated in FIG. 2.

The reprint controller 19 controls reprinting of a job that is a reprint target specified by a user. To control reprinting, the reprint controller 19 refers to the list of job storage sites 17, thereby identifying the intermediate data generation units 20 that store intermediate data of individual pages of a job as a reprint target, and instructs the intermediate data generation units 20 that store the intermediate data of the individual pages to transmit the data to the rendering processor 30 in the order of pages. As described above, instead of a method in which the job controller 10 instructs the individual intermediate data generation units 20 to output intermediate data of individual pages in a top-down manner, a method in which the rendering processor 30 requests the individual intermediate data generation units 20 to transmit the intermediate data of the individual pages may be used. Furthermore, instead of a method in which an instruction is provided to the individual intermediate data generation units 20 that store intermediate data of individual pages using the list of job storage sites 17, a method in which an instruction or request to transfer intermediate data is provided to all the intermediate data generation units 20 by specifying a job ID and a page number may be used.

An example of the procedure of print processing that is performed using the job controller 10 will be described with reference to FIG. 3. The procedure illustrated in FIG. 3 is not a procedure of reprinting, but is a procedure executed when an instruction to print a new document is provided from a user.

In this procedure, it is determined in step S10 whether or not the current operation mode of the job controller 10 is a mode of using intermediate data generation units 20 of another system. The procedure illustrated in FIG. 3 is based on the assumption that the job controller 10 is loaded in the same computer system as a certain intermediate data generation unit 20. In step S10, it is determined whether or not an operation mode of performing parallel processing using another intermediate data generation unit 20 in addition to the certain intermediate data generation unit 20 is specified. If the determination result is "NO", the job controller 10 distributes pieces of print data of individual pages of a job to the intermediate data generation unit 20 that is loaded in the same computer as the job controller 10.

If the determination result in step S10 is "YES", the UI unit 11 of the job controller 10 acquires information about the list of intermediate data generation units 15 in step S12, and provides a UI screen that is used for selection and includes the list to the PC of the user who has provided the print instruction. With the use of the UI screen, the UI unit 11 accepts selection of the intermediate data generation units 20 to be used for parallel processing from the user in step S14. Furthermore, the UI unit 11 accepts selection of whether or not intermediate data generated from the print data related to the print instruction is to be stored in the selected intermediate data generation units 20 (and the intermediate data generation unit 20 in the computer in which the job controller 10 is loaded), in other words, whether or not reprinting will be performed, in step S16.

In step S14, the list of available intermediate data generation units 20 presented to the user may include the load status at the time of each of the intermediate data generation units 20, so that the user is allowed to select the intermediate data generation units 20 to be used with reference to the load status. Examples of the load status of each of the intermediate data generation units 20 may be the number of pages to be processed by the intermediate data generation unit 20, the usage ratio of the CPU or memory of the intermediate data generation unit 20, and a load index value obtained from the combination thereof.

Subsequently, in step S18, the allocation controller 13 of the job controller 10 acquires, from the list of intermediate data generation units 15, transfer speed information indicating the data transfer speeds of the selected intermediate data generation units 20 (and the intermediate data generation unit 20 in the computer in which the job controller 10 is loaded) with respect to the rendering processor 30. In step S20, the allocation controller 13 determines, for each of the intermediate data generation units 20, whether or not the transfer speed is higher than or equal to the print speed of the print engine 40.

If it is determined in step S20 that the transfer speed is higher than or equal to the print speed for all the selected intermediate data generation units 20 (the determination result is "YES"), the allocation controller 13 distributes the pages of the job to the intermediate data generation units 20 in accordance with the print order.

If the determination result in step S20 is "NO", that is, if there is an intermediate data generation unit 20 whose transfer speed is lower than the print speed among the selected intermediate data generation units 20, the UI unit 11 presents, to the user, a message indicating that the use of the selected intermediate data generation units 20 may cause suspension of printing in the print engine 40, which may generate a waste sheet, and asks the user whether or not generation of a waste sheet is permitted in step S22. If generation of a waste sheet is permitted, the allocation controller 13 distributes the pages of the job to the intermediate data generation units 20 that are selected in step S14 in accordance with the print order. If generation of a waste sheet is not permitted, the intermediate data generation unit 20 whose transfer speed is lower than the print speed is selected and deleted in step S24 from among the intermediate data generation units 20 that are selected in step S14, and the pages of the job are distributed to the remaining intermediate data generation units 20.

As described above, in this procedure, if generation of a waste sheet is not permitted, an intermediate data generation unit 20 that may cause suspension of printing is excluded from targets to which pages are allocated, in accordance with the relationship between data transfer speeds in communication path between the intermediate data generation units 20 and the rendering processor 30, and the print speed of the print engine 40. Accordingly, the possibility that suspension of printing occurs may be reduced, and generation of a waste sheet may be suppressed.

Figure 3:
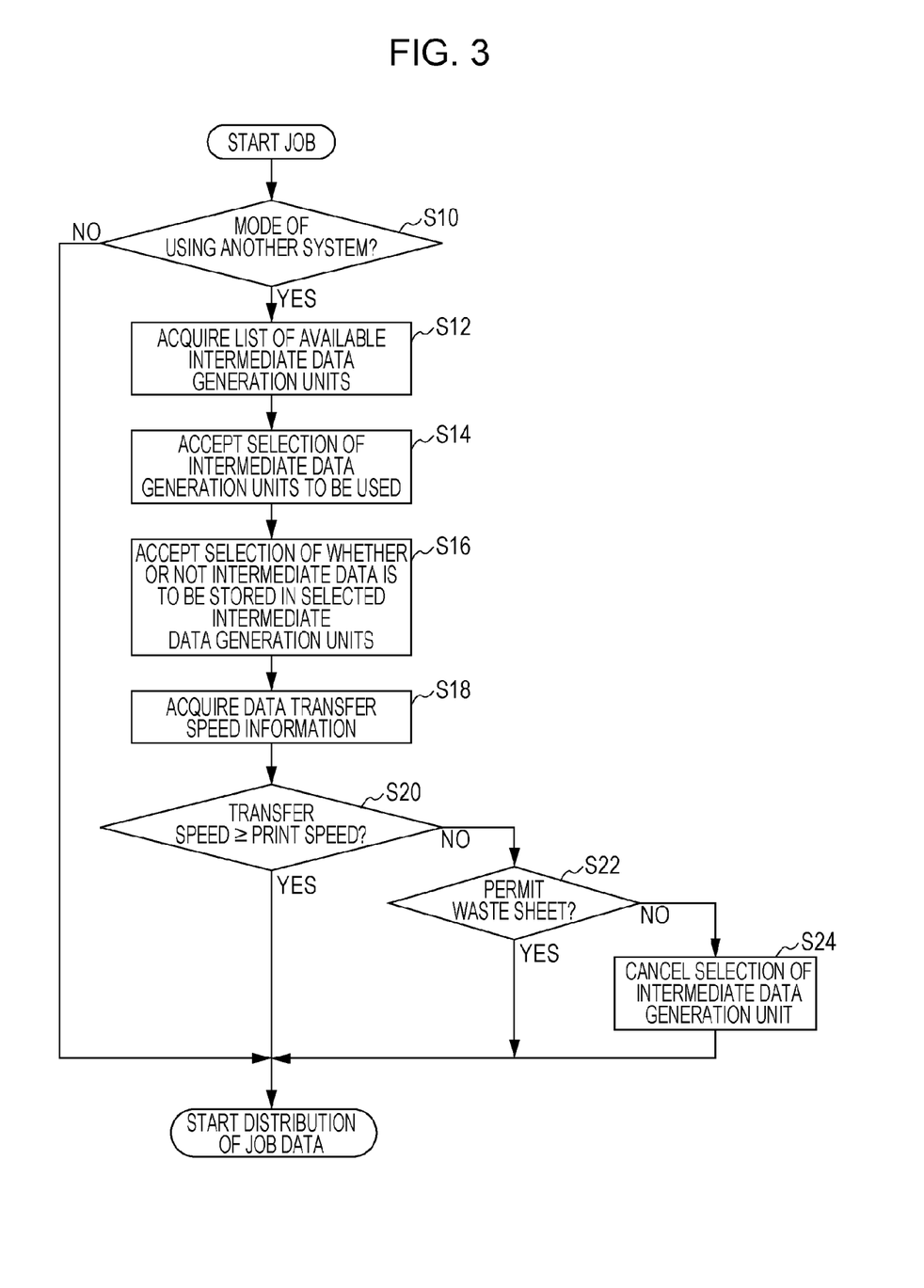
FIG. 3 is a diagram illustrating an example of a processing procedure of the system according to the exemplary embodiment.

The procedure illustrated in FIG. 3 is performed in a case where the print engine 40 is of a type that may generate a waste sheet when print suspension occurs. In a case where the print engine 40 is of a type that does not generate a waste sheet even if printing is suspended, steps S20 to S24 are not necessary.

In the procedure illustrated in FIG. 3, the user selects intermediate data generation units 20 to be used from among all the intermediate data generation units 20. Alternatively, the user may specify the number of intermediate data generation units 20 to be operated in parallel, and the job controller 10 may automatically select the specified number of intermediate data generation units 20 to be used for a job from among all the intermediate data generation units 20. In the case of automatic selection, for example, the specified number of intermediate data generation units 20 may be selected in descending order of data transfer speed for the rendering processor 30, or in ascending order of current processing load, or in descending order of processing and transfer speeds.

In the example described above, only one pair of the rendering processor 30 and the print engine 40 exists in the system. Alternatively, plural pairs of the rendering processor 30 and the print engine 40 may exist in the system. In a case where plural pairs exist, the list of intermediate data generation units 15 stores, for each set of an intermediate data generation unit 20 and a pair of the rendering processor 30 and the print engine 40, information about the data transfer speed between the intermediate data generation unit 20 and the rendering processor 30 in the set. When an instruction to perform new printing or reprinting is provided, a pair of the rendering processor 30 and the print engine 40 as an output destination is specified by the user. In the determination in step S20 in FIG. 3, the transfer speed between each selected intermediate data generation unit 20 and the rendering processor 30 as the specified output destination is compared with the print speed of the print engine 40 as the specified output destination.

If the system includes plural pairs of the rendering processor 30 and the print engine 40, the system may include both the print engine 40 that generates a waste sheet when print suspension occurs due to insufficient supply of print image data and the print engine 40 that does not generate a waste sheet. In this case, only in a case where the print engine 40 serving as an output destination specified by a user is of a type that generates a waste sheet when print suspension occurs, control may be performed so that the intermediate data generation unit 20 whose data transfer speed is lower than the print speed is not selected as a device that creates and stores intermediate data, as in the procedure illustrated in FIG. 3. In this example, in a case where the print engine 40 of the type that does not generate a waste sheet when print suspension occurs is selected as an output destination, any of available intermediate data generation units 20 is selectable regardless of the data transfer speed. Information indicating the type of each print engine 40, the type that generates a waste sheet or the type that does not generate a waste sheet, may be registered in advance in the job controller 10. For example, many of print engines that use a continuous sheet as a print medium generate a waste sheet when print suspension occurs, and many of print engines that use a cut sheet as a print medium do not generate a waste sheet.

In the above-described example, intermediate data generated by the interpretation unit 22 of each intermediate data generation unit 20 is stored in the memory 24 of the same intermediate data generation unit 20. Alternatively, pieces of intermediate data of individual pages generated by the interpretation units 22 of a certain number of intermediate data generation units 20 may be collectively stored in the memories 24 of a fewer number of intermediate data generation units 20. In this case, it is not necessary for an intermediate data generation unit 20 that does not store intermediate data to include the memory 24 (even if such an intermediate data generation unit 20 includes the memory 24, large capacity for storing data for reprinting is not necessary). A predetermined number of or a user-specified number of intermediate data generation units 20 that store intermediate data may be selected in descending order of data transfer speed for the rendering processor 30. Among the intermediate data generation units 20 selected by the user, the intermediate data generation unit 20 that is not selected as a device for storing intermediate data transfers intermediate data of the page generated by itself to any of the selected intermediate data generation units 20. The intermediate data generation unit 20 serving as a data transfer destination may be determined in advance for each of the intermediate data generation units 20. In this example, at the start of printing, pages that are to be printed earlier may be preferentially allocated to the intermediate data generation units 20 having a high data transfer speed (selected as a device for storing intermediate data).

In the above-described example, the system includes only one job controller 10, but the system may include plural job controllers 10.

Figure 4:
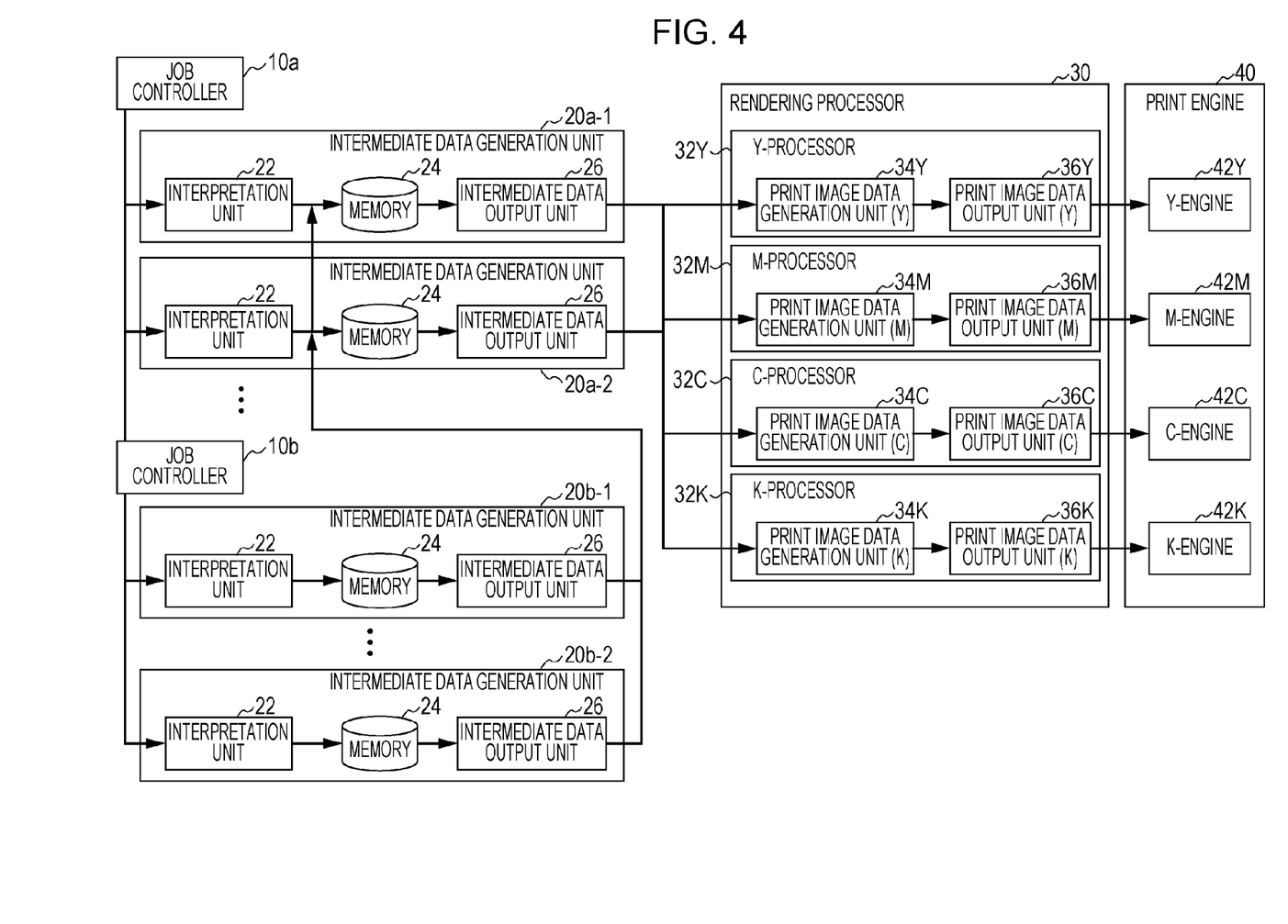
FIG. 4 is a functional block diagram illustrating an example of a system configuration including plural job controllers.

For example, FIG. 4 illustrates a system configuration including two job controllers 10a and 10b. In this example, the job controller 10a directly controls intermediate data generation units 20a-1, 20a-2, . . . , and the job controller 10b directly controls intermediate data generation units 20b-1, 20b-2, . . . . In this system configuration, for example, the job controller 10a and the intermediate data generation units 20a-1, 20a-2, . . . may be loaded on individual blades of a single blade server chassis, and the job controller 10b and the intermediate data generation units 20b-1, 20b-2, . . . may be loaded on individual blades of another blade server chassis. In each chassis, the blades may communicate with one another via a high-speed internal network. Further, the job controllers 10 and the intermediate data generation units 20 in different chassis may communicate with one another via an external network whose speed is generally lower than that of the internal network.

In the example illustrated in FIG. 4, the intermediate data generation units 20a-1, 20a-2, . . . that are managed by the job controller 10a are connected to the rendering processor 30 via a communication path whose data transfer speed is higher than or equal to the print speed of the print engine 40 (between the intermediate data generation units 20 and the rendering processor 30), and the intermediate data generation units 20b-1, 20b-2, . . . that are managed by the job controller 10b are connected to the rendering processor 30 via a communication path whose data transfer speed is lower than the print speed of the print engine 40.

Pieces of intermediate data generated by the intermediate data generation units 20b-1, 20b-2, . . . are transferred to the intermediate data generation units 20a-1, 20a-2, . . . and are then transferred to the rendering processor 30. At an early stage of a print job, pages that are to be printed earlier may be preferentially allocated to the intermediate data generation units 20a-1, 20a-2, . . . that store intermediate data therein, and pages that are to be printed later may be allocated to the intermediate data generation units 20b-1, 20b-2, . . . that do not store intermediate data therein and transfer the intermediate data to other intermediate data generation units 20a-1 and so forth. Accordingly, earlier pages of the job are printed out earlier.

In the system configuration illustrated in FIG. 4, for example, in a case where the job controller 10a accepts a print instruction from a user, the job controller 10a allocates processing operations of pages to the intermediate data generation units 20a-1, 20a-2, . . . that are managed thereby, and also allocates processing operations of pages to the intermediate data generation units 20b-1, 20b-2, . . . that are managed by the job controller 10b, via the job controller 10b.

In the system configuration illustrated in FIG. 4, a subsystem used by a user may be selected in units of sub-systems managed by the job controllers 10a and 10b (in other words, in units of server chassis) in steps S10 to S18 in the procedure illustrated in FIG. 3. In this example, transfer speed information is registered in units of sub-systems in the list of intermediate data generation units 15 illustrated in FIG. 2 (that is, the intermediate data generation units 20 belonging to the same sub-system have the same data transfer speed for the rendering processor 30). When receiving a print instruction, the job controller 10a or 10b refers to the list 15 so as to perform control so that the sub-system whose data transfer speed is lower than the print speed does not participate in distribution processing of generating intermediate data. In another example, the job controller 10a or 10b refers to the list 15, and allows a sub-system whose data transfer speed is lower than the print speed to participate in distribution processing under the condition that the sub-system transfers generated intermediate data to a sub-system whose data transfer speed is higher than or equal to the print speed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print data processing system comprising:
   a plurality of intermediate data generation units each of which interprets page-description-language data representing a target document to be printed and generates intermediate data in units of pages;
   an allocation unit that allocates processes of interpreting the page-description-language data to the plurality of intermediate data generation units in units of pages and causes the plurality of intermediate data generation units to execute processes of interpreting pages in parallel;
   one or more memories that store pieces of intermediate data of the individual pages generated by the plurality of intermediate data generation units;
   a print image conversion unit that acquires the pieces of intermediate data of the individual pages from the one or more memories via a communication path between the print image conversion unit and the one or more memories, converts the acquired pieces of intermediate data of the individual pages to print image data that is capable of being handled by a printer, and supplies the print image data to the printer;
   a reprint controller that, in a case where an instruction to reprint the target document is provided, performs control to cause the print image conversion unit to reacquire the pieces of intermediate data that correspond to the target document and that are stored in the one or more memories, and to reconvert the reacquired pieces of intermediate data to the print image data; and
   a controller that performs control so that, among the one or more memories, a memory whose transfer speed of transferring a piece of intermediate data to the print image conversion unit via the communication path is lower than a transfer speed corresponding to a print speed of the printer is not selected as a unit that stores the pieces of intermediate data of the individual pages generated by the plurality of intermediate data generation units.

2. The print data processing system according to claim 1, wherein the controller determines whether or not suspension of the printer due to insufficient supply of the print image data is permitted, and, in a case where the suspension is permitted, allows the memory whose transfer speed of transferring a piece of intermediate data to the print image conversion unit via the communication path is lower than the transfer speed corresponding to the print speed of the printer to be selected as a unit that stores the pieces of intermediate data of the individual pages generated by the plurality of intermediate data generation units.

3. The print data processing system according to claim 1, wherein, in a case where the printer specified as an output destination is of a type that does not generate a waste sheet when suspension occurs due to insufficient supply of print image data, the controller allows the memory whose transfer speed is lower than the transfer speed corresponding to the print speed of the printer to be selected as a unit that stores the pieces of intermediate data of the individual pages generated by the plurality of intermediate data generation units.

4. The print data processing system according to claim 2, wherein, in a case where the printer specified as an output destination is of a type that does not generate a waste sheet when suspension occurs due to insufficient supply of print image data, the controller allows the memory whose transfer speed is lower than the transfer speed corresponding to the print speed of the printer to be selected as a unit that stores the pieces of intermediate data of the individual pages generated by the plurality of intermediate data generation units.

5. A print data processing method comprising:
   interpreting page-description-language data representing a target document to be printed and generating intermediate data in units of pages;
   allocating processes of interpreting the page-description-language data to a plurality of intermediate data generation units in units of pages and causing the plurality of intermediate data generation units to execute processes of interpreting pages in parallel;
   storing, in one or more memories, pieces of intermediate data of the individual pages generated by the plurality of intermediate data generation units;
   acquiring the pieces of intermediate data of the individual pages from the one or more memories via a communication path, converting the acquired pieces of intermediate data of the individual pages to print image data that is capable of being handled by a printer, and supplying the print image data to the printer;
   in a case where an instruction to reprint the target document is provided, performing control to reacquire the pieces of intermediate data that correspond to the target document and that are stored in the one or more memories, and to reconvert the reacquired pieces of intermediate data to the print image data; and
   performing control so that, among the one or more memories, a memory whose transfer speed of transferring a piece of intermediate data via the communication path is lower than a transfer speed corresponding to a print speed of the printer is not selected as a unit that stores the pieces of intermediate data of the individual pages generated by the plurality of intermediate data generation units.

6. A non-transitory computer readable medium storing a program causing a computer to execute a process for processing print data, the process comprising:

interpreting page-description-language data representing a target document to be printed and generating intermediate data in units of pages;

allocating processes of interpreting the page-description-language data to a plurality of intermediate data generation units in units of pages and causing the plurality of intermediate data generation units to execute processes of interpreting pages in parallel;

storing, in one or more memories, pieces of intermediate data of the individual pages generated by the plurality of intermediate data generation units;

acquiring the pieces of intermediate data of the individual pages from the one or more memories via a communication path, converting the acquired pieces of intermediate data of the individual pages to print image data that is capable of being handled by a printer, and supplying the print image data to the printer;

in a case where an instruction to reprint the target document is provided, performing control to reacquire the pieces of intermediate data that correspond to the target document and that are stored in the one or more memories, and to reconvert the reacquired pieces of intermediate data to the print image data; and     performing control so that, among the one or more memories, a memory whose transfer speed of transferring a piece of intermediate data via the communication path is lower than a transfer speed corresponding to a print speed of the printer is not selected as a unit that stores the pieces of intermediate data of the individual pages generated by the plurality of intermediate data generation units.

7. The print data processing system according to claim 1, wherein the print speed is set based on a delay caused by data transfer processing.

\* \* \* \* \*